US012741912B2

(12) United States Patent
Kawamura et al.

(10) Patent No.: US 12,741,912 B2
(45) Date of Patent: Sep. 22, 2026

(54) CUBIC BORON NITRIDE SINTERED MATERIAL AND TOOL

(71) Applicants: SUMITOMO ELECTRIC INDUSTRIES, LTD., Osaka (JP); SUMITOMO ELECTRIC HARDMETAL CORP., Hyogo (JP)

(72) Inventors: Yu Kawamura, Osaka (JP); Akito Ishii, Osaka (JP); Masato Michiuchi, Osaka (JP); Katsumi Okamura, Osaka (JP); Yuta Yoshioka, Hyogo (JP); Yuh Ishida, Hyogo (JP)

(73) Assignees: Sumitomo Electric Industries, Ltd., Osaka (JP); SUMITOMO ELECTRIC HARDMETAL CORP., Hyogo (JP)

( * ) Notice: Subject to any disclaimer, the term of this patent is extended or adjusted under 35 U.S.C. 154(b) by 0 days.

(21) Appl. No.: 19/117,827

(22) PCT Filed: Jul. 10, 2024

(86) PCT No.: PCT/JP2024/024936

§ 371 (c)(1),
(2) Date: Apr. 2, 2025

(87) PCT Pub. No.: WO2026/013791

PCT Pub. Date: Jan. 15, 2026

(65) Prior Publication Data

US 2026/0015291 A1 Jan. 15, 2026

(51) Int. Cl.
*C04B 35/5831* (2006.01)

(52) U.S. Cl.
CPC .................... *C04B 35/5831* (2013.01); *C04B 2235/3847* (2013.01); *C04B 2235/386* (2013.01); *C04B 2235/402* (2013.01); *C04B 2235/405* (2013.01); *C04B 2235/428* (2013.01)

(58) Field of Classification Search
CPC .................. B24D 7/00; C04B 35/5831; C04B 2235/386; C04B 2235/3847; C04B 2235/402; C04B 2235/405; C04B 2235/428
See application file for complete search history.

(56) References Cited

U.S. PATENT DOCUMENTS

2008/0214383 A1 9/2008 Matsukawa et al.
2008/0286558 A1* 11/2008 Kukino ................ C04B 41/009 428/323
2012/0282050 A1* 11/2012 Setoyama ............... C04B 41/90 428/323
2016/0052827 A1* 2/2016 Matsuda ................ C22C 26/00 264/626
2019/0061014 A1* 2/2019 Nishizawa .............. C04B 41/00
2021/0309580 A1* 10/2021 Ishii .................... C04B 35/6262
2023/0227949 A1 7/2023 Ishii et al.
2023/0295779 A1 9/2023 Watanabe et al.

FOREIGN PATENT DOCUMENTS

JP 2010-089223 A 4/2010
JP 2014-198637 A 10/2014
WO 2005/066381 A1 7/2005
WO 2022/025291 A1 2/2022
WO 2022/025293 A1 2/2022

* cited by examiner

*Primary Examiner* — Pegah Parvini

(74) *Attorney, Agent, or Firm* — Renner, Otto, Boisselle & Sklar, LLP

(57) ABSTRACT

A cubic boron nitride sintered material includes: 70 volume % or more and 99 volume % or less of a cubic boron nitride grains; and a binder, wherein the binder includes a first compound including chromium, cobalt and carbon, tungsten carbide, cobalt, and aluminum, and in the first compound, a ratio $N_{Cr}/(N_{Cr}+N_{Co})$ of the number $N_{Cr}$ of atoms of the chromium to a sum of the number $N_{Cr}$ of the atoms of the chromium and the number $N_{Co}$ of atoms of the cobalt is 0.10 or more and 0.90 or less.

11 Claims, No Drawings

CUBIC BORON NITRIDE SINTERED MATERIAL AND TOOL

This application is a national phase of International Application No. PCT/JP2024/024936 filed Jul. 10, 2024, which is hereby incorporated herein by reference in its entirety.

TECHNICAL FIELD

The present disclosure relates to a cubic boron nitride sintered material and a tool.

BACKGROUND ART

Since a cubic boron nitride (hereinafter, also referred to as "cBN") sintered material has very high hardness and is excellent in thermal stability and chemical stability, the cubic boron nitride sintered material has been used in cutting tools and wear-resistant tools. In the cubic boron nitride sintered material, a content ratio of cBN grains, a type of a binder, and the like have been reviewed in order to obtain a property corresponding to a purpose of use.

PTL 1 discloses a technique of suppressing sudden occurrence of breakage in a tool using a cubic boron nitride sintered material by appropriately selecting a binder.

CITATION LIST

Patent Literature

PTL 1: WO 2005/066381

SUMMARY OF INVENTION

A cubic boron nitride sintered material of the present disclosure is a cubic boron nitride sintered material comprising: 70 volume % or more and 99 volume % or less of a cubic boron nitride grains; and a binder, wherein the binder includes a first compound including chromium, cobalt and carbon, tungsten carbide, cobalt, and aluminum, and in the first compound, a ratio $N_{Cr}/(N_{Cr}+N_{Co})$ of the number $N_{Cr}$ of atoms of the chromium to a sum of the number $N_{Cr}$ of the atoms of the chromium and the number $N_{Co}$ of atoms of the cobalt is 0.10 or more and 0.90 or less.

DETAILED DESCRIPTION

Problem to be Solved by the Present Disclosure

There has been required a cubic boron nitride sintered material by which a tool having a long tool life even in processing of a sintered alloy when used as a tool material can be provided.

Therefore, an object of the present disclosure is to provide: a cubic boron nitride sintered material by which a tool having a long tool life even in processing of a sintered alloy when used as a tool material can be provided; and a tool including the cubic boron nitride sintered material.

Advantageous Effect of the Present Disclosure

According to the present disclosure, it is possible to provide: a cubic boron nitride sintered material by which a tool having a long tool life even in processing of a sintered alloy when used as a tool material can be provided; and a tool including the cubic boron nitride sintered material.

DESCRIPTION OF EMBODIMENTS

First, embodiments of the present disclosure will be listed and described.

(1) A cubic boron nitride sintered material of the present disclosure is a cubic boron nitride sintered material comprising: 70 volume % or more and 99 volume % or less of a cubic boron nitride grains; and a binder, wherein the binder includes a first compound including chromium, cobalt and carbon, tungsten carbide, cobalt, and aluminum, and in the first compound, a ratio $N_{Cr}/(N_{Cr}+N_{Co})$ of the number $N_{Cr}$ of atoms of the chromium to a sum of the number $N_{Cr}$ of the atoms of the chromium and the number $N_{Co}$ of atoms of the cobalt is 0.10 or more and 0.90 or less.

According to the present disclosure, it is possible to provide: a cubic boron nitride sintered material by which a tool having a long tool life even in processing of a sintered alloy when used as a tool material can be provided; and a tool including the cubic boron nitride sintered material.

(2) In (1), in a first graph in which an X-ray diffraction pattern of the cubic boron nitride sintered material is indicated in a coordinate system in which a horizontal axis represents a diffraction angle 2θ and a vertical axis represents a diffraction intensity cps, a peak intensity $I_{BN}$ of cubic boron nitride and a peak intensity $I_a$ of the first compound may indicate a relation of $0.0010 \leq I_a/I_{BN} \leq 0.300$.

Thus, the tool life is further improved.

(3) In (2), the peak intensity $I_{BN}$ and the peak intensity $I_a$ may have a relation of $0.01 \leq I_a/I_{BN} \leq 0.10$.

Thus, the tool life is further improved.

(4) In any of (1) to (3), the $N_{Cr}/(N_{Cr}+N_{Co})$ may be 0.20 or more and 0.90 or less. Thus, the tool life is further improved.

(5) In any of (1) to (4), the $N_{Cr}/(N_{Cr}+N_{Co})$ may be 0.50 or more and 0.90 or less. Thus, the tool life is further improved.

(6) In any one of (1) to (5), in the first compound, a total content ratio of the chromium and the cobalt may be 10 atomic % or more, a content ratio of the carbon may be 5 atomic % or more, and a total content ratio of the chromium, the cobalt and the carbon may be 40 atomic % or more.

Thus, the tool life is further improved.

(7) In any of (1) to (6), a content ratio of the first compound in the cubic boron nitride sintered material may be 0.1 volume % or more and 29 volume % or less. Thus, the tool life is further improved.

(8) In any of (1) to (7), the first compound may include at least one first element selected from a group consisting of nitrogen, titanium, vanadium, zirconium, niobium, molybdenum, hafnium, tantalum, tungsten, rhenium, and silicon. Thus, the tool life is further improved.

(9) In any of (1) to (8), the binder may further include a second compound consisting of at least one element selected from a group consisting of titanium, zirconium, hafnium, vanadium, niobium, tantalum, chromium, and aluminum, and at least one element selected from a group consisting of carbon, nitrogen, and oxygen. Thus, the breakage resistance of the cutting tool is further improved.

(10) In any of (1) to (9), the binder may further include silicon. Thus, the wear resistance of the cutting tool is further improved.

(11) A tool of the present disclosure is a tool including the cubic boron nitride sintered material according to any of the above (1) to (10). Thus, a tool having a long tool life can be provided even in processing of a sintered alloy.

DETAILS OF EMBODIMENTS OF THE PRESENT DISCLOSURE

In the present disclosure, the expression "A to B" represents a range of lower to upper limits (i.e., A or more and B or less), and when no unit is indicated for A and a unit is indicated only for B, the unit of A is the same as the unit of B.

When a compound or the like is expressed by a chemical formula in the present disclosure and an atomic ratio is not particularly limited, it is assumed that all the conventionally known atomic ratios are included, and the atomic ratio should not be necessarily limited only to one in the stoichiometric range.

In the present disclosure, when one or more numerical values are described as each of lower and upper limits of a numerical range, it is assumed that a combination of any one numerical value described as the lower limit and any one numerical value described as the upper limit is also disclosed.

In the present disclosure, the terms "comprise", "include", "have", and variations thereof are open-ended terms. Each of the open-ended terms may or may not further include an additional element in addition to an essential element. The description "consist of" is a closed term. It should be noted that even a configuration expressed by such a closed term can include an impurity introduced in an ordinary case or an additional element irrelevant to the target technology.

In order to develop a cubic boron nitride sintered material by which a tool having a long tool life even in processing of a sintered alloy can be provided, the present inventors first have processed a sintered alloy by using a tool including a conventional cubic boron nitride sintered material, and have observed a state of damage of the tool. As a result, the following finding has been obtained. In response to the processing, a metal-based binder having a hardness lower than that of cBN is selectively worn in the cubic boron nitride sintered material, with the result that the cBN grains are exposed. Next, bonding between the cBN grains is cut, with the result that the cBN grains fall off. As a result, a cutting edge ridgeline of the tool is rounded to cause a burr or the like in a workpiece, with the result that the tool life is reached.

Based on the above finding, the present inventors have conducted diligent study with attention being particularly paid to wear resistance and bonding force between the cBN grains, and have obtained the cubic boron nitride sintered material of the present disclosure. Specific examples of the cubic boron nitride sintered material and the tool of the present disclosure will be described below.

First Embodiment: Cubic Boron Nitride Sintered Material

A cubic boron nitride sintered material according to one embodiment (hereinafter, also referred to as "first embodiment") of the present disclosure is a cubic boron nitride sintered material including: 70 volume % or more and 99 volume % or less of cubic boron nitride grains; and a binder, wherein the binder includes a first compound including chromium, cobalt and carbon, tungsten carbide, cobalt, and aluminum, and in the first compound, a ratio $N_{Cr}/(N_{Cr}+N_{Co})$ of the number $N_{Cr}$ of atoms of the chromium to a sum of the number $N_{Cr}$ of the atoms of the chromium and the number $N_{Co}$ of atoms of the cobalt is 0.10 or more and 0.90 or less.

When the cubic boron nitride sintered material of the present disclosure is used as a tool material, a tool having a long tool life even in processing of a sintered alloy can be provided. This is presumably due to the following reasons.

(i) The cubic boron nitride sintered material of the present disclosure includes 70 volume % or more and 99 volume % or less of cubic boron nitride grains having excellent strength and toughness. Therefore, the cubic boron nitride sintered material can also have excellent strength and toughness. Therefore, the tool including the cubic boron nitride sintered material can have excellent wear resistance and breakage resistance even in processing of a sintered alloy.

(ii) The binder of the cubic boron nitride sintered material of the present disclosure includes the first compound including the chromium, the cobalt, and the carbon. In the first compound, the ratio $N_{Cr}/(N_{Cr}+N_{Co})$ of the number $N_{Cr}$ of the atoms of the chromium to the sum of the number $N_{Cr}$ of the atoms of the chromium and the number $N_{Co}$ of the atoms of the cobalt is 0.10 or more and 0.90 or less. Since the first compound has high hardness, the cubic boron nitride sintered material including the first compound can also have high hardness. Therefore, the tool including the cubic boron nitride sintered material can have excellent wear resistance even in processing of a sintered alloy.

(iii) The first compound included in the cubic boron nitride sintered material of the present disclosure is originated from cobalt and chromium added to a source material powder in order to promote dissolution and crystallization of the cubic boron nitride grains during production of the cubic boron nitride sintered material. When cobalt and chromium are added to the source material powder, necking of the cubic boron nitride grains can be grown at the time of sintering, thereby improving thermal conductivity of the cubic boron nitride sintered material. Therefore, in the tool including the obtained cubic boron nitride sintered material, occurrence of thermal cracking is suppressed even in processing of a sintered alloy.

Composition of Cubic Boron Nitride Sintered Material

The cubic boron nitride sintered material according to the first embodiment includes: 70 volume % or more and 99 volume % or less of the cubic boron nitride grains; and the binder. The binder includes: the first compound including the chromium, the cobalt, and the carbon; the tungsten carbide; the cobalt; and the aluminum. The cubic boron nitride sintered material according to the first embodiment may consist of 70 volume % or more and 99 volume % or less of the cubic boron nitride grains; and the binder.

In the cubic boron nitride sintered material according to the first embodiment, the content ratio of the cubic boron nitride grains is 70 volume % or more and 99 volume % or less. The lower limit of the content ratio of the cubic boron nitride grains in the cubic boron nitride sintered material is 70 volume % or more, may be 80 volume % or more, or may be 90 volume % or more from the viewpoint of improving the hardness. The upper limit of the content ratio of the cubic boron nitride grains in the cubic boron nitride sintered material may be 99 volume % or less or 95 volume % or less from the viewpoint of improving the toughness. The content ratio of the cubic boron nitride grains in the cubic boron nitride sintered material may be 80 volume % or more and 99 volume % or less, may be 90 volume % or more and 99 volume % or less, or may be 90 volume % or more and 95 volume % or less.

The content ratio of the binder in the cubic boron nitride sintered material according to the first embodiment may be 1 volume % or more and 30 volume % or less, 1 volume % or more and 10 volume % or less, or 5 volume % or more and 10 volume % or less.

A total content ratio of the cubic boron nitride grains and the binder in the cubic boron nitride sintered material according to the first embodiment may be 71 volume % or more and 99.9 volume % or less, 81 volume % or more and 99.9 volume % or less, or 95 volume % or more and 99.9 volume % or less.

A total content ratio of the cubic boron nitride grains and the first compound in the cubic boron nitride sintered material according to the first embodiment may be 70.1 volume % or more and 99.1 volume % or less, 73 volume % or more and 99 volume % or less, 90.1 volume % or more and 95 volume % or less, or 91 volume % or more and 95 volume % or less.

The cubic boron nitride sintered material according to the first embodiment may include an inevitable impurity as long as the effect of the present disclosure is not impaired. The cubic boron nitride sintered material according to the first embodiment may consist of the cubic boron nitride grains, the binder, and the inevitable impurity. Examples of the inevitable impurity include nitrogen and oxygen. When the cubic boron nitride sintered material includes the inevitable impurity, the content ratio of the inevitable impurity in the cubic boron nitride sintered material can be 0.1 mass % or less. The content ratio of the inevitable impurity in the cubic boron nitride sintered material can be measured by secondary ion mass spectrometry (SIMS).

The cubic boron nitride sintered material according to the first embodiment can consist of the cubic boron nitride grains, the first compound, the tungsten carbide, the cobalt, and the aluminum. In addition to the first compound, the tungsten carbide, the cobalt, and the aluminum, the cubic boron nitride sintered material according to the first embodiment can include a below-described second compound, a simple substance of silicon, and an impurity originated from the source material, a production condition, or the like, as long as the effect of the present disclosure is not impaired. The cubic boron nitride sintered material according to the first embodiment can consist of the cubic boron nitride grains, the first compound, the tungsten carbide, the cobalt, the aluminum, one or both of the second compound and the silicon, and the inevitable impurity.

The content ratio (volume %) of the cBN grains and the content ratio (volume %) of the binder in the cubic boron nitride sintered material can be checked by performing structure observation, elemental analysis, and the like onto the cubic boron nitride sintered material using an energy dispersive X-ray spectrometer (EDX) (Octane Elect EDS system) accompanied with a scanning electron microscope (SEM) ("JSM-7800F" (trade name) provided by JEOL) (hereinafter, also referred to as "SEM-EDX"). A specific measurement method is as follows.

The cubic boron nitride sintered material is cut at any position so as to expose a cross section of the cubic boron nitride sintered material, and the cross section is polished. For the cutting of the cubic boron nitride sintered material, a focused ion beam device, a cross section polisher device, or the like can be used. When the cubic boron nitride sintered material is used as a portion of a tool, the portion corresponding to the cubic boron nitride sintered material is cut out by a diamond grindstone electrodeposition wire or the like so as to expose a sample including a cross section of the cubic boron nitride sintered material.

Next, the cross section is observed by the SEM at a magnification of 5000 times to obtain a reflected electron image. In the reflected electron image, a black region represents a region in which the cBN grains exist and a gray or white region represents a region in which the binder exists, for example.

Next, binarization processing is performed onto the reflected electron image using image analysis software ("WinROOF 2018" provided by Mitani Corporation) so as to extract only the cBN grains. Since a threshold value for the binarization is changed depending on a contrast, the threshold value is set for each image. From the image having been through the binarization processing, the area ratio of pixels originated from dark fields (pixels originated from the cBN grains) in the area of the measurement visual field is calculated. The calculated area ratio is regarded as volume %, thereby finding the content ratio (volume %) of the cBN grains in the cubic boron nitride sintered material. An elemental analysis can be performed onto the cubic boron nitride sintered material using the SEM-EDX to confirm that the pixels originated from the dark fields are originated from the cBN grains.

The content ratio (volume %) of the binder in the cubic boron nitride sintered material can be found from the image having been through the binarization processing by calculating the area ratio of the pixels originated from the bright fields (pixels originated from the binder) in the area of the measurement visual field. The pixels originated from the bright fields can be confirmed to be originated from the binder, by performing an elemental analysis onto the cubic boron nitride sintered material using the SEM-EDX.

The measurement for the area percentages of the cBN grains and the binder is performed in each of five measurement visual fields that do not overlap with one another so as to calculate the averages of the area percentages of the cBN grains and the binder in the five measurement visual fields. In the present disclosure, the average of the area percentages of the cBN grains in the five measurement visual fields corresponds to the content ratio (volume %) of the cubic boron nitride grains in the cubic boron nitride sintered material. In the present disclosure, the average of the area percentages of the binder in the five measurement visual fields corresponds to the content ratio (volume %) of the binder in the cubic boron nitride sintered material.

As long as the applicant has performed the measurement, it has been confirmed that there is almost no variation in the measurement result even when the five measurement visual fields are freely set in the same sample and the measurement of the content ratios of the cubic boron nitride grains and the binder in the cubic boron nitride sintered material is performed a plurality of times in accordance with the above procedure.

In the cubic boron nitride sintered material according to the first embodiment, the content ratio of the first compound may be 0.1 volume % or more and 29 volume % or less. The lower limit of the content ratio of the first compound in the cubic boron nitride sintered material may be 0.1 volume % or more, 0.15 volume % or more, 0.2 volume % or more, or 0.3 volume % or more from the viewpoint of improving the hardness. The upper limit of the content ratio of the first compound in the cubic boron nitride sintered material may be 29 volume % or less, 15 volume % or less, 10 volume % or less, 9 volume % or less, or 3 volume % or less. The content ratio of the first compound in the cubic boron nitride sintered material may be 0.15 volume % or more and 15 volume % or less, may be 0.2 volume % or more and 9 volume % or less, or may be 0.3 volume % or more and 3 volume % or less.

In the present disclosure, the content ratio (volume %) of the first compound in the cubic boron nitride sintered material is measured in accordance with the following procedure using an energy dispersive X-ray spectrometer (EDX) (dual SSD system provided by JEOL) accompanied with a transmission electron microscope (TEM) ("JEM-ARM300F2" (trademark) provided by JEOL) (hereinafter, also referred to as "TEM-EDX").

(A1) The cubic boron nitride sintered material is sliced to have a thickness of 30 to 100 nm using an argon ion slicer ("Cryo Ion Slicer IB-09060BCIS" (trademark) provided by JEOL) under conditions of an acceleration voltage of 6 kV and a finishing of 2 kV, thereby producing a measurement sample.

(B1) Next, the measurement sample is observed with the TEM at a magnification of 20,000 times under condition of an acceleration voltage of 200 kV, thereby obtaining a first image.

(C1) A measurement visual field having a quadrangular shape of 10 μm×10 μm is set in the first image. In the measurement visual field, an element distribution analysis is performed using the TEM-EDX. Measurement conditions are as follows: an acceleration voltage is 200 kV, a camera length is 10 cm, the number of pixels is 512×512 pixels, and a dwell time is 0.5 ms/pixel. Based on a result of the element distribution analysis, a matrix is obtained which is constituted of 512×512 pixels (hereinafter, also referred to as "512×512 pixels") in each of which the respective atom-based content ratios (atomic %) of the chromium, the cobalt, and the carbon are indicated.

(D1) After adding the content ratio of the chromium and the content ratio of the cobalt in each pixel of the obtained matrix constituted of the 512×512 pixels, binarization processing is performed to obtain a first binarization image in which pixels each including at least one of the chromium and the cobalt are extracted. As a setting condition for threshold value, "Otsu's binarization method", which is one of well-known automatic threshold value determination methods, is applied.

(E1) Next, in each pixel of the obtained matrix constituted of the 512×512 pixels, binarization processing is performed based on the content ratio of the carbon, thereby obtaining a second binarization image in which pixels each including the carbon are extracted. As a setting condition for threshold value, "Otsu's binarization method" is applied.

(F1) Based on the first binarization image and the second binarization image, pixels (hereinafter, also referred to as "first pixels") each extracted in both the first binarization image and the second binarization image are specified among the 512×512 pixels. Hereinafter, a region corresponding to the first pixels among the 512×512 pixels is also referred to as a region R1.

(G1) In each of the first pixels of region R1, the ratio $N_{Cr}/(N_{Cr}+N_{Co})$ of the number $N_{Cr}$ of the atoms of the chromium to the sum of the number $N_{Cr}$ of the atoms of the chromium and the number $N_{Co}$ of the atoms of the cobalt is calculated. A median value A of $N_{Cr}/(N_{Cr}+N_{Co})$ of all the first pixels of region R1 is calculated.

(H1) The calculation for median value A is performed in five measurement visual fields that do not overlap with one another, and an average B of median values A of $N_{Cr}/(N_{Cr}+N_{Co})$ in the five measurement visual fields is calculated. In the present disclosure, when average B is 0.10 or more and 0.90 or less, it is determined that each of regions R1 in the five measurement visual fields corresponds to the first compound in which $N_{Cr}/(N_{Cr}+N_{Co})$ is 0.10 or more and 0.90 or less.

(I1) A percentage (N1/NA)×100 of the number N1 of the first pixels of regions R1 corresponding to the first compound in all the five measurement visual fields with respect to the number NA of all the pixels in all the five measurement visual fields is calculated. In the present disclosure, the percentage (N1/NA)×100 corresponds to the content ratio (volume %) of the first compound of the cubic boron nitride sintered material.

As long as the applicant has performed the measurement, it has been confirmed that there is almost no variation in the measurement result even when the five measurement visual fields are freely set in the same sample and the measurement of the content ratio of the first compound in the cubic boron nitride sintered material is performed a plurality of times in accordance with the above procedure.

Cubic Boron Nitride Grains

<<Composition of Cubic Boron Nitride Grains>>

In the first embodiment, each of the cubic boron nitride grains consists of cubic boron nitride. The cubic boron nitride grain can include an impurity as well as the cubic boron nitride as long as the effect of the present disclosure is not impaired. When the cubic boron nitride grain includes the impurity, the content ratio of the impurity in the cubic boron nitride grain can be 0.1 mass % or less. The content ratio of the impurity in the cubic boron nitride grain can be measured by secondary ion mass spectrometry (SIMS).

<<Average Grain Size of Cubic Boron Nitride Grains>>

In the cubic boron nitride sintered material according to the first embodiment, the average grain size of the cubic boron nitride grains is not particularly limited, and can be a general average grain size used in a conventional cubic boron nitride sintered material. The grain size of each cubic boron nitride grain may be, for example, 0.1 μm or more and 10 μm or less.

In the present disclosure, the average grain size of the cubic boron nitride grains is measured in accordance with the following procedure. A cross section of the cBN sintered material is exposed in the same manner as in the procedure for measuring the content ratio of the cubic boron nitride grains in the cubic boron nitride sintered material, and the cross section is polished.

Next, the polished surface is observed with an SEM at a magnification of 10,000 times to obtain an SEM image. A measurement visual field having a quadrangular shape of 12 μm×15 μm is set in the SEM image. The SEM image is processed using image analysis software ("WinROOF ver. 7.4.5" provided by Mitani Corporation), thereby obtaining an equivalent circle diameter of each cBN grain observed in the measurement visual field. The arithmetic average of the equivalent circle diameters of all the cBN grains in the measurement visual field is calculated. The arithmetic average corresponds to the average grain size of the cBN grains in the measurement visual field.

The above measurement is performed in each of five measurement visual fields that do not overlap with one another. The arithmetic average of the average grain sizes of the cBN grains in the five measurement visual fields is calculated. In the present disclosure, the arithmetic average of the average grain sizes of the five measurement visual fields corresponds to the average grain size of the cubic boron nitride grains.

As long as the applicant has performed the measurement, it has been confirmed that there is almost no variation in the measurement result even when the five measurement visual fields are freely set in the same sample and the measurement of average grain size of the cubic boron nitride grains is performed a plurality of times in accordance with the above procedure.

First Compound

The binder of the cubic boron nitride sintered material according to the first embodiment includes the first compound. The first compound includes the chromium, the cobalt, and the carbon, and in the first compound, the ratio $N_{Cr}/(N_{Cr}+N_{Co})$ of the number $N_{Cr}$ of the atoms of the chromium to the sum of the number $N_{Cr}$ of the atoms of the chromium and the number $N_{Co}$ of the atoms of the cobalt is 0.10 or more and 0.90 or less. The first compound may be a compound represented by CrCoC.

The lower limit of $N_{Cr}/(N_{Cr}+N_{Co})$ may be 0.20 or more and 0.90 or less, may be 0.30 or more and 0.90 or less, may be 0.50 or more and 0.90 or less, or may be 0.65 or more and 0.80 or less, from the viewpoint of promoting dissolution and crystallization of the cubic boron nitride grains and promoting growth of necking of the cubic boron nitride grains during the production of the cubic boron nitride sintered material.

In the present disclosure, $N_{Cr}/(N_{Cr}+N_{Co})$ corresponds to average B of median values A of $N_{Cr}/(N_{Cr}+N_{Co})$ in the five measurement visual fields as found in accordance with the procedure (A1) to (H1) described in the method of measuring the content ratio (volume %) of the first compound of the cubic boron nitride sintered material.

In the first compound of the cubic boron nitride sintered material according to the first embodiment, the total content ratio of the chromium and the cobalt may be 10 atomic % or more, the content ratio of the carbon may be 10 atomic % or more, and the total content ratio of the chromium, the cobalt, and the carbon may be 40 atomic % or more. In the first compound of the cubic boron nitride sintered material according to the first embodiment, the total content ratio of the chromium and the cobalt may be 10 atomic % or more, the content ratio of the carbon may be 5 atomic % or more, and the total content ratio of the chromium, the cobalt, and the carbon may be 40 atomic % or more.

The total content ratio of the chromium and the cobalt in the first compound may be 10 atomic % or more and 90 atomic % or less, 20 atomic % or more and 80 atomic % or less, or 30 atomic % or more and 70 atomic % or less from the viewpoint of promoting the growth of necking of the cubic boron nitride grains.

The lower limit of the content ratio of the carbon in the first compound may be 5 atomic % or more, 10 atomic % or more, or 15 atomic % or more from the viewpoint that the first compound has high hardness as a carbide. The upper limit of the content ratio of the carbon in the first compound may be 90 atomic % or less, 80 atomic % or less, or 70 atomic % or less from the viewpoint of reducing suppression of growth of necking of the cubic boron nitride grains. The content ratio of the carbon in the first compound may be 5 atomic % or more and 90 atomic % or less, may be 10 atomic % or more and 80 atomic % or less, or may be 15 atomic % or more and 70 atomic % or less.

The total content ratio of the chromium, the cobalt, and the carbon in the first compound may be 40 atomic % or more and 100 atomic % or less, 50 atomic % or more and 90 atomic % or less, or 60 atomic % or more and 80 atomic % or less, from the viewpoint of sufficiently exhibiting the effect of the present disclosure.

In the cubic boron nitride sintered material according to the first embodiment, in addition to the chromium, the cobalt, and the carbon, the first compound may include at least one first element selected from a group consisting of nitrogen, titanium, vanadium, zirconium, niobium, molybdenum, hafnium, tantalum, tungsten, rhenium, and silicon. When the first element is nitrogen, the first compound may be CrCoCN. The nitrogen is an element that may be introduced into the first compound in the process of producing the first compound. The nitrogen may be dissolved in CrCoC in the solid state. When the first element is at least one selected from the group consisting of titanium, vanadium, zirconium, niobium, molybdenum, hafnium, tantalum, tungsten, rhenium, and silicon, each of these elements may be dissolved in CrCoC in the solid state.

The total content ratio of the first element(s) in the first compound may be 0 atomic % or more and 25 atomic % or less, may be 3 atomic % or more and 15 atomic % or less, and may be 5 atomic % or more and 10 atomic % or less.

In the present disclosure, the content ratio (atomic %) of each of the chromium, the cobalt, the carbon, and the first element in the first compound is measured in accordance with the following procedure. Region R1 corresponding to the first compound in which $N_{Cr}/(N_{Cr}+N_{Co})$ is 0.10 or more and 0.90 or less is specified in accordance with the procedure (A1) to (H1) described in the method of measuring the content ratio (volume %) of the first compound of the cubic boron nitride sintered material. An element distribution analysis is performed onto all the first pixels of region R1 by the TEM-EDX, and the respective average values of the content ratios (atomic %) of the chromium, the cobalt, the carbon, and the first element in region R1 are calculated based on the measurement result. The respective average values of the content ratios (atomic %) of the chromium, the cobalt, the carbon and the first element in region R1 correspond to the respective content ratios (atomic %) of the chromium, the cobalt, the carbon and the first element in the first compound.

As long as the applicant has performed the measurement, it has been confirmed that there is almost no variation in the measurement result even when the five measurement visual fields are freely set in the same sample and the measurement of the content ratios of the chromium, the cobalt, the carbon and the first element in the first compound is performed a plurality of times in accordance with the above procedure.

The first compound may include an element other than the chromium, the cobalt, the carbon, and the first element as long as the effect of the present disclosure is not impaired. For example, the other element may be boron, oxygen, or aluminum.

Tungsten Carbide

The binder of the cubic boron nitride sintered material according to the first embodiment includes the tungsten carbide. The lower limit of the content ratio of the tungsten carbide in the cubic boron nitride sintered material according to the first embodiment may be 0.1 volume % or more, 0.2 volume % or more, or 0.3 volume % or more from the viewpoint of improving the hardness. The upper limit of the content ratio of the tungsten carbide in the cubic boron nitride sintered material may be 29 volume % or less, 10 volume % or less, 7 volume % or less, 6 volume % or less, or 3 volume % or less. The content ratio of the tungsten carbide in the cubic boron nitride sintered material may be 0.1 volume % or more and 29 volume % or less, may be 0.2 volume % or more and 10 volume % or less, may be 0.2 volume % or more and 7 volume % or less, may be 0.2 volume % or more and 6 volume % or less, or may be 0.3 volume % or more and 3 volume % or less.

In the present disclosure, the content ratio of the tungsten carbide in the cubic boron nitride sintered material is measured in accordance with the following procedure.

(A2) An element distribution analysis is performed in accordance with the procedure (A1) to (C1) described in the method of measuring the content ratio (volume %) of the first compound of the cubic boron nitride sintered material described above, thereby obtaining a matrix constituted of 512×512 pixels in each of which the respective atom-based content ratios (atomic %) of the carbon and the tungsten are indicated.

(B2) Binarization processing is performed onto each pixel of the obtained matrix constituted of the 512×512 pixels based on the content ratio of the carbon, thereby obtaining a second binarization image in which pixels each including the carbon are extracted. As a setting condition for threshold value, "Otsu's binarization method" is applied.

(C2) In each pixel of the obtained matrix constituted of the 512×512 pixels, binarization processing is performed based on the content ratio of the tungsten, thereby obtaining a third binarization image in which pixels each including the tungsten are extracted. As a setting condition for threshold value, "Otsu's binarization method" is applied.

(D2) Based on the second binarization image and the third binarization image, pixels (hereinafter, also referred to as "second pixels") each extracted in both the second binarization image and the third binarization image is specified among the 512×512 pixels.

(E2) A percentage (N2/NA)×100 of the number N2 of the second pixels with respect to the number NA of all the pixels in the five measurement visual fields is calculated. In the present disclosure, the percentage (N2/NA)×100 corresponds to the content ratio (volume %) of the tungsten carbide in the cubic boron nitride sintered material.

As long as the applicant has performed the measurement, it has been confirmed that there is almost no variation in the measurement result even when the five measurement visual fields are freely set in the same sample and the measurement of the content ratio of the tungsten carbide in the cubic boron nitride sintered material is performed a plurality of times in accordance with the above procedure.

Cobalt

The cubic boron nitride sintered material according to the first embodiment includes the cobalt. This cobalt exists as a cobalt phase consisting of a simple substance of cobalt and is distinguished from the cobalt included in the first compound.

The lower limit of the content ratio of the cobalt in the cubic boron nitride sintered material according to the first embodiment may be 0.1 volume % or more, 0.5 volume % or more, or 1.0 volume % or more from the viewpoint of improving the toughness. The upper limit of the content ratio of the cobalt in the cubic boron nitride sintered material may be 29 volume % or less, 17 volume % or less, 14 volume % or less, 5 volume % or less, or 3 volume % or less. The content ratio of the cobalt in the cubic boron nitride sintered material may be 0.1 volume % or more and 29 volume % or less, may be 0.5 volume % or more and 17 volume % or less, may be 1.0 volume % or more and 14 volume % or less, may be 1.0 volume % or more and 5 volume % or less, or may be 1.0 volume % or more and 3 volume % or less. Here, the content ratio of the cobalt is the content ratio of the simple substance of cobalt.

In the present disclosure, the content ratio of the cobalt in the cubic boron nitride sintered material is measured in accordance with the following procedure.

(A3) An element distribution analysis is performed in accordance with the procedure (A1) to (C1) described in the method of measuring the content ratio (volume %) of the first compound of the cubic boron nitride sintered material described above, pixels (hereinafter, also referred to as "third pixels") in each of which only the cobalt exists are specified in a matrix constituted of 512×512 pixels.

(B3) A percentage (N3/NA)×100 of the number N3 of the third pixels with respect to the number NA of all the pixels in the five measurement visual fields is calculated. In the present disclosure, the percentage (N3/NA)×100 corresponds to the content ratio of the cobalt (volume %) in the cubic boron nitride sintered material.

As long as the applicant has performed the measurement, it has been confirmed that there is almost no variation in the measurement result even when the five measurement visual fields are freely set in the same sample and the measurement of the content ratio of the cobalt in the cubic boron nitride sintered material is performed a plurality of times in accordance with the above procedure.

Aluminum

The cubic boron nitride sintered material according to the first embodiment includes the aluminum. The aluminum exists as an aluminum phase consisting of a simple substance of aluminum.

The lower limit of the content ratio of the aluminum in the cubic boron nitride sintered material according to the first embodiment may be 0.1 volume % or more, 0.2 volume % or more, or 0.3 volume % or more from the viewpoint of improving the toughness. The upper limit of the content ratio of the aluminum in the cubic boron nitride sintered material may be 29 volume % or less, 10 volume % or less, or 3 volume % or less. The content ratio of the aluminum in the cubic boron nitride sintered material may be 0.1 volume % or more and 29 volume % or less, may be 0.2 volume % or more and 10 volume % or less, or may be 0.3 volume % or more and 3 volume % or less. Here, the content ratio of the aluminum is the content ratio of the simple substance of aluminum.

In the present disclosure, the content ratio of the aluminum in the cubic boron nitride sintered material is measured in accordance with the following procedure.

(A4) An element distribution analysis is performed in accordance with the procedure (A1) to (C1) described in the method of measuring the content ratio (volume %) of the first compound of the cubic boron nitride sintered material described above, and pixels (hereinafter, also referred to as "fourth pixels") in each of which only the aluminum exists are specified in a matrix constituted of 512×512 pixels.

(B4) A percentage (N4/NA)×100 of the number N4 of the fourth pixels with respect to the number NA of all the pixels in the five measurement visual fields is calculated. In the present disclosure, the percentage (N4/NA)×100 corresponds to the content ratio (volume %) of the aluminum in the cubic boron nitride sintered material.

As long as the applicant has performed the measurement, it has been confirmed that there is almost no variation in the measurement result even when the five measurement visual fields are freely set in the same sample and the measurement of the content ratio of the aluminum in the cubic boron nitride sintered material is performed a plurality of times in accordance with the above procedure.

Second Compound

The binder of the cubic boron nitride sintered material according to the first embodiment may further include the second compound consisting of at least one element selected from the group consisting of titanium, zirconium, hafnium, vanadium, niobium, tantalum, chromium, and aluminum and at least one element selected from the group consisting of carbon, nitrogen, and oxygen. Thus, the breakage resistance of the cutting tool is further improved.

The second compound may be at least one selected from a group consisting of AlN, TiC, ZrC, HfC, VC, NbC, TaC, TiN, ZrN, HfN, VN, NbN, TaN, CrN, TiCN, ZrCN, HfCN, NbCN, TaCN, $Al_2O_3$, and $ZrO_2$.

Other Component

The binder of the cubic boron nitride sintered material according to the first embodiment may include silicon. This silicon exists as a simple substance of silicon, and is distinguished from the silicon serving as the first element included in the first compound. Thus, the wear resistance of the cutting tool is further improved.

The binder of the cubic boron nitride sintered material according to the first embodiment may include nickel. Thus, the toughness of the cubic boron nitride sintered material is improved.

X-Ray Diffraction Pattern

In a first graph in which an X-ray diffraction pattern of the cubic boron nitride sintered material according to the first embodiment is indicated in a coordinate system in which the horizontal axis represents a diffraction angle 2θ and the vertical axis represents a diffraction intensity cps, a peak intensity $I_{BN}$ of the cubic boron nitride and a peak intensity $I_a$ of the first compound may indicate a relation of $0.0010 \leq I_a/I_{BN} \leq 0.350$, a relation of $0.0010 \leq I_a/I_{BN} \leq 0.300$, or a relation of $0.01 \leq I_a/I_{BN} \leq 0.10$.

$I_a/I_{BN}$ may be 0.01 or more and 0.300 or less, or 0.02 or more and 0.10 or less.

In the present disclosure, the X-ray diffraction pattern of the cubic boron nitride sintered material is obtained in accordance with the following procedure. The cubic boron nitride sintered material is cut out by a diamond grindstone electrodeposition wire, and the cut surface is observed.

An X-ray diffraction pattern of the cut surface of the cubic boron nitride sintered material is obtained using an X-ray diffractometer ("MiniFlex 600" (trade name) provided by Rigaku). Conditions of the X-ray diffractometer on this occasion are as follows.

Characteristic X-ray: Cu-Kα (wavelength of 1.54 Å)

Tube voltage: 40 kV

Tube current: 15 mA

Filter: multilayer mirror

Optical system: concentration method

X-ray diffraction method: θ-2θ method

The obtained X-ray diffraction pattern is indicated in the coordinate system in which the horizontal axis represents the diffraction angle 2θ and the vertical axis represents the diffraction intensity cps, thereby obtaining the first graph. In the first graph, the peak intensity $I_{BN}$ of the cubic boron nitride and the peak intensity $I_a$ of the first compound are measured. The peak indicating the peak intensity $I_{BN}$ of the cubic boron nitride theoretically exists at the diffraction angle 2θ of 43.37°. However, the diffraction angle 2θ of the peak indicating the peak intensity $I_{BN}$ may be shifted by a range of ±0.3° from 43.37° due to variation in measurement or the atomic ratios of the chromium and the cobalt in the first compound. In this case, the X-ray diffraction pattern on the first graph is normalized such that the diffraction angle 2θ of the peak indicating the peak intensity $I_{BN}$ becomes 43.37°.

The peak intensity $I_{BN}$ of the cubic boron nitride is an intensity obtained by excluding the background from the peak intensity at the diffraction angle 2θ of 43.37°. In the first graph after normalizing the X-ray diffraction pattern, the peak indicating the peak intensity $I_a$ of the first compound exists at the diffraction angle 2θ of 39.08°±0.5°. The peak intensity $I_a$ of the first compound is an intensity obtained by excluding the background from the peak intensity at the diffraction angle 2θ of 39.08°±0.5°.

Method of Producing Cubic Boron Nitride Sintered Material

A method of producing the cubic boron nitride sintered material according to the first embodiment will be described. The method of producing the cubic boron nitride sintered material according to the first embodiment can include a source material powder preparation step, a mixing step, and a sintering step.

<<Source Material Powder Preparation Step>>

As source material powders, a cubic boron nitride powder, a first source material powder, and a second source material powder are prepared.

The cubic boron nitride powder is a source material powder for the cubic boron nitride grains included in the cubic boron nitride sintered material. The cubic boron nitride powder may be produced by adding a catalyst (Li, Ca, Mg, and nitrides, borides, and boronitrides thereof) to a hexagonal boron nitride powder and then performing heating and pressing, or a commercially available cBN powder may be prepared.

The first source material powder can be obtained, for example, by mixing a CoCr alloy produced by an atomization method with a carbon powder and calcinating them in a nitrogen atmosphere. The first source material powder may be obtained by adding a first element powder to the CoCr alloy and the carbon powder, mixing them, and calcinating them in a nitrogen atmosphere.

The first element powder may be at least one selected from a group consisting of a titanium powder, a vanadium powder, a zirconium powder, a niobium powder, a molybdenum powder, a hafnium powder, a tantalum powder, a tungsten powder, a rhenium powder, and a silicon powder.

The first source material powder is mixed by a ball mill, a bead mill, a planetary mill, a jet mill, or the like. Thus, a homogeneous first source material powder can be obtained. Mixing and pulverizing methods for each of them may be of wet type or dry type. The average particle size of the first source material powder may be, for example, 0.05 μm or more and 3 μm or less. In the present disclosure, the average particle size of the source material powder means an average particle size measured by an FSSS (Fisher Sub-Sieve Sizer) method. The average particle size is measured using "Sub-Sieve Sizer Model 95" (trademark) provided by Fisher Scientific. The particle size distribution of the source material powder is measured using a particle size distribution measurement device (trade name: MT3300EX) provided by Microtrac.

The second source material powder can be obtained by mixing a tungsten carbide powder, a cobalt powder, and an aluminum powder, and then calcinating and pulverizing them for homogenization. The second source material powder may be obtained by further adding a silicon powder, a second compound source material powder, a nickel powder, or the like to the tungsten carbide powder, the cobalt powder, and the aluminum powder, mixing them, and then calcinating and pulverizing them.

The second compound source material powder may be at least one selected from a group consisting of an AlN powder, a TiC powder, a ZrC powder, a HfC powder, a VC powder, a NbC powder, a TaC powder, a TiN powder, a ZrN powder, a HfN powder, a VN powder, a NbN powder, a TaN powder, a CrN powder, a TiCN powder, a ZrCN powder, a HfCN powder, a NbCN powder, a TaCN powder, an $Al_2O_3$ powder, and a $ZrO_2$ powder.

For the mixing, a ball mill, a bead mill, a planetary mill, a jet mill, or the like can be used. Thus, a homogeneous second source material powder can be obtained. Mixing and pulverizing methods for each of them may be of wet type or dry type. The average particle size of the second source material powder may be, for example, 0.05 μm or more and 3 μm or less.

<<Mixing Step>>

The cubic boron nitride powder, the first source material powder, and the second source material powder are mixed at predetermined ratios to obtain a powder mixture. The mixing is wet type ball mill mixing using ethanol, acetone, or the like as a solvent. After preparing the powder mixture, the solvent is removed by natural drying or vacuum hot water drying. Further, the powder mixture can be subjected to heat treatment (for example, at 200° C. or more under vacuum). Thus, an impurity such as moisture adsorbed on its surface can be removed.

<<Sintering Step>>

By sintering the powder mixture, the cubic boron nitride sintered material according to the first embodiment is obtained. Specifically, the powder mixture sealed in vacuum is sintered using an ultra-high temperature and high pressure apparatus. A sintering temperature is 1600° C. or more and 1900° C. or less. A sintering pressure is 5.5 GPa or more and 8.0 GPa or less. A holding time is 10 minutes or more and 50 minutes or less.

Second Embodiment: Tool

A tool according to one embodiment of the present disclosure (hereinafter, also referred to as "second embodiment") is a tool including the cubic boron nitride sintered material according to the first embodiment. A whole of the tool may be composed of the cubic boron nitride sintered material, or only a portion of the tool (for example, a cutting edge portion in the case of a cutting tool) may be composed of the cubic boron nitride sintered material. Moreover, a coating film may be formed on a surface of each of the tools. Examples of the tool include a cutting tool, a wear-resistant tool, and the like.

Examples of the cutting tool include a drill, an end mill, an indexable cutting insert for drill, an indexable cutting insert for end mill, an indexable cutting insert for milling, an indexable cutting insert for turning, a metal saw, a gear cutting tool, a reamer, a tap, a cutting bite, and the like.

Examples of the wear-resistant tool include a die, a scriber, a scribing wheel, a dresser, and the like. Examples of the grinding tool include a grinding stone and the like.

Supplementary Note 1

A cubic boron nitride sintered material comprising: 70 volume % or more and 99 volume % or less of a cubic boron nitride grain; and a binder, wherein the binder includes a first compound including chromium, cobalt and carbon, tungsten carbide, a simple substance of cobalt, and a simple substance of aluminum, and in the first compound, a ratio $N_{Cr}/(N_{Cr}+N_{Co})$ of the number $N_{Cr}$ of atoms of the chromium to a sum of the number $N_{Cr}$ of the atoms of the chromium and the number $N_{Co}$ of atoms of the cobalt is 0.10 or more and 0.90 or less.

EXAMPLES

The present embodiment will be described more specifically with reference to examples. It should be noted that the present embodiment is not limited by these examples.

Production of Cubic Boron Nitride Sintered Material

Each of cubic boron nitride sintered materials of samples was produced in accordance with the following procedure.

<<Source Material Powder Preparation Step>>

As source material powders, a cubic boron nitride powder, a first source material powder, and a second source material powder were prepared.

The first source material powder was obtained by mixing a CoCr alloy produced by an atomization method, a carbon powder, and a first element powder at ratios described in the columns "CoCr", "C", and "First Element Powder" of the "First Source Material Powder" in each of Tables 1 and 2, and calcinating them in vacuum. It should be noted that only in the case of a sample 29, the calcination was performed in a nitrogen atmosphere. A ratio of the number of atoms of Co and the number of atoms of Cr in the CoCr alloy used in each sample was the same as a ratio of the "Atomic %" of "Co" and the "Atomic %" of "Cr" in the "First Compound" in each of Tables 5 and 6. The first source material powder was mixed by a ball mill in the wet manner. The average particle size of the first source material powder was 0.1 μm or more and 3 μm or less. In each of the tables, the indication "-" indicates that a corresponding powder was not used.

For the second source material powder, powders having compositions described in the column "Second Source Material Powder" of each of Tables 1 and 2 were prepared. For example, in a sample 1, a tungsten carbide (WC) powder, a cobalt (Co) powder, and an aluminum (Al) powder were prepared. These powders were mixed, were then calcined, and were pulverized to obtain the second source material powder. The second source material powder was mixed by a ball mill in the wet manner. The average particle size of the second source material powder was 0.1 μm or more and 3 μm or less.

<<Mixing Step>>

The cubic boron nitride powder, the first source material powder, and the second source material powder were mixed at mass ratios described in the columns of the "cBN Powder", the "First Source Material Powder", and the "Second Source Material Powder" of the "Source Material Powder" in each of Tables 1 and 2, thereby obtaining a powder mixture. The mixing was wet type ball mill mixing using ethanol as a solvent. After preparing the powder mixture, the solvent was removed by natural drying.

<<Sintering Step>>

By sintering the powder mixture, each of the cubic boron nitride sintered materials of the samples was obtained. Specifically, the powder mixture sealed in vacuum was sintered using an ultra-high temperature and high pressure apparatus. A sintering temperature was 1700° C., a sintering pressure was 7 GPa, and a holding time was 15 minutes.

TABLE 1

| | Source Material Powder | | | First Source Material Powder | | | | |
|---|---|---|---|---|---|---|---|---|
| | | First Source | Second Source | | | | | |
| Sample | cBN Powder | Material Powder | Material Powder | CoCr | C | First Element Powder | | Second Source Material Powder |
| No. | Mass % | Mass % | Mass % | Mass % | Mass % | Type | Mass % | Composition |
| 1 | 80.5 | 3.6 | 15.9 | 93.0 | 7.0 | — | — | WC, Co, Al |
| 2 | 43.9 | 2.7 | 53.4 | 93.0 | 7.0 | — | — | WC, Co, Al |
| 3 | 49.6 | 2.9 | 47.5 | 93.0 | 7.0 | — | — | WC, Co, Al |
| 4 | 97.7 | 0.5 | 1.8 | 93.0 | 7.0 | — | — | WC, Co, Al |
| 5 | 100.0 | 0.0 | 0.0 | — | — | — | — | — |
| 6 | 80.3 | 3.8 | 15.9 | 93.4 | 6.6 | — | — | WC, Co, Al |
| 7 | 80.3 | 3.8 | 15.9 | 93.3 | 6.7 | — | — | WC, Co, Al |
| 8 | 80.3 | 3.8 | 15.9 | 93.3 | 6.7 | — | — | WC, Co, Al |
| 9 | 80.5 | 3.6 | 15.9 | 93.0 | 7.0 | — | — | WC, Co, Al |
| 10 | 80.5 | 3.5 | 16.0 | 92.8 | 7.2 | — | — | WC, Co, Al |
| 11 | 80.5 | 3.5 | 16.0 | 92.7 | 7.3 | — | — | WC, Co, Al |
| 12 | 80.6 | 3.4 | 16.0 | 92.7 | 7.3 | — | — | WC, Co, Al |
| 13 | 78.6 | 0.0 | 21.4 | 93.0 | 7.0 | — | — | WC, Co, Al |
| 14 | 78.8 | 0.1 | 21.1 | 93.0 | 7.0 | — | — | WC, Co, Al |
| 15 | 79.0 | 0.9 | 20.0 | 93.0 | 7.0 | — | — | WC, Co, Al |
| 16 | 82.9 | 9.3 | 7.8 | 93.0 | 7.0 | — | — | WC, Co, Al |
| 17 | 60.3 | 20.1 | 19.6 | 93.0 | 7.0 | — | — | WC, Co, Al |
| 18 | 58.1 | 22.5 | 19.4 | 93.0 | 7.0 | — | — | WC, Co, Al |
| 19 | 81.6 | 2.3 | 16.1 | 39.5 | 60.5 | — | — | WC, Co, Al |
| 20 | 81.4 | 2.5 | 16.1 | 60.3 | 39.7 | — | — | WC, Co, Al |
| 21 | 80.6 | 3.4 | 16.0 | 98.3 | 1.7 | — | — | WC, Co, Al |
| 22 | 80.7 | 3.3 | 16.0 | 97.0 | 3.0 | — | — | WC, Co, Al |
| 23 | 81.0 | 2.9 | 16.0 | 93.0 | 7.0 | — | — | WC, Co, Al |
| 24 | 80.8 | 3.2 | 16.0 | 92.9 | 7.1 | — | — | WC, Co, Al |
| 25 | 76.9 | 0.1 | 23.0 | 93.0 | 7.0 | — | — | WC, Co, Al |
| 26 | 78.8 | 0.1 | 21.1 | 93.0 | 7.0 | — | — | WC, Co, Al |
| 27 | 59.8 | 38.3 | 1.8 | 93.0 | 7.0 | — | — | WC, Co, Al |
| 28 | 60.1 | 39.9 | 0.0 | 93.0 | 7.0 | — | — | |
| 29 | 80.1 | 4.0 | 15.8 | 93.0 | 7.0 | N | Calcinated under Nitrogen | WC, Co, Al |
| 30 | 80.5 | 3.6 | 15.9 | 78.9 | 6.0 | Ti | 15.1 | WC, Co, Al |
| 31 | 80.3 | 3.8 | 15.9 | 78.2 | 5.9 | V | 15.9 | WC, Co, Al |
| 32 | 80.3 | 3.8 | 15.9 | 69.4 | 5.3 | Zr | 25.3 | WC, Co, Al |
| 33 | 80.1 | 4.0 | 15.8 | 69.1 | 5.2 | Nb | 25.6 | WC, Co, Al |

TABLE 2

| | Source Material Powder | | | First Source Material Powder | | | | |
|---|---|---|---|---|---|---|---|---|
| | | First Source | Second Source | | | | | |
| Sample | cBN Powder | Material Powder | Material Powder | CoCr | C | First Element Powder | | Second Source Material Powder |
| No. | Mass % | Mass % | Mass % | Mass % | Mass % | Type | Mass % | Composition |
| 34 | 80.0 | 4.1 | 15.8 | 68.6 | 5.2 | Mo | 26.2 | WC, Co, Al |
| 35 | 79.6 | 4.6 | 15.7 | 55.9 | 4.2 | Hf | 39.8 | WC, Co, Al |
| 36 | 79.5 | 4.8 | 15.7 | 55.6 | 4.2 | Ta | 40.2 | WC, Co, Al |
| 37 | 79.4 | 4.9 | 15.7 | 55.3 | 4.2 | W | 40.5 | WC, Co, Al |
| 38 | 79.3 | 5.0 | 15.7 | 55.0 | 4.2 | Re | 40.8 | WC, Co, Al |
| 39 | 80.6 | 3.4 | 16.0 | 84.2 | 6.4 | Si | 9.4 | WC, Co, Al |
| 40 | 80.8 | 3.6 | 15.6 | 93.0 | 7.0 | — | — | WC, Co, Al, TiC |
| 41 | 80.6 | 3.6 | 15.7 | 93.0 | 7.0 | — | — | WC, Co, Al, ZrC |
| 42 | 79.7 | 3.6 | 16.7 | 93.0 | 7.0 | — | — | WC, Co, Al, HfC |
| 43 | 80.8 | 3.6 | 15.6 | 93.0 | 7.0 | — | — | WC, Co, Al, VC |
| 44 | 80.4 | 3.6 | 15.9 | 93.0 | 7.0 | — | — | WC, Co, Al, NbC |
| 45 | 79.5 | 3.5 | 17.0 | 93.0 | 7.0 | — | — | WC, Co, Al, TaC |
| 46 | 80.8 | 3.6 | 15.6 | 93.0 | 7.0 | — | — | WC, Co, Al, TiN |
| 47 | 80.5 | 3.6 | 15.8 | 93.0 | 7.0 | — | — | WC, Co, Al, ZrN |
| 48 | 79.5 | 3.6 | 16.9 | 93.0 | 7.0 | — | — | WC, Co, Al, HfN |
| 49 | 80.7 | 3.6 | 15.7 | 93.0 | 7.0 | — | — | WC, Co, Al, VN |
| 50 | 80.3 | 3.6 | 16.0 | 93.0 | 7.0 | — | — | WC, Co, Al, NbN |
| 51 | 79.5 | 3.5 | 17.0 | 93.0 | 7.0 | — | — | WC, Co, Al, TaN |
| 52 | 80.7 | 3.6 | 15.7 | 93.0 | 7.0 | — | — | WC, Co, Al, CrN |
| 53 | 80.8 | 3.6 | 15.5 | 93.0 | 7.0 | — | — | WC, Co, Al, TiCN |
| 54 | 80.5 | 3.6 | 15.8 | 93.0 | 7.0 | — | — | WC, Co, Al, ZrCN |
| 55 | 79.6 | 3.6 | 16.8 | 93.0 | 7.0 | — | — | WC, Co, Al, HfCN |
| 56 | 80.4 | 3.6 | 15.9 | 93.0 | 7.0 | — | — | WC, Co, Al, NbCN |
| 57 | 79.5 | 3.5 | 17.0 | 93.0 | 7.0 | — | — | WC, Co, Al, TaCN |
| 58 | 81.1 | 3.6 | 15.3 | 93.0 | 7.0 | — | — | WC, Co, Al, AlN |
| 59 | 81.0 | 3.6 | 15.4 | 93.0 | 7.0 | — | — | WC, Co, Al, $Al_2O_3$ |
| 60 | 80.7 | 3.6 | 15.6 | 93.0 | 7.0 | — | — | WC, Co, Al, $ZrO_2$ |
| 61 | 81.2 | 3.6 | 15.1 | 93.0 | 7.0 | — | — | WC, Co, Al, Si |

Evaluations on Cubic Boron Nitride Sintered Material

<<Composition>>

In each of the cubic boron nitride sintered materials of the samples, the content ratio (volume %) of the cubic boron nitride grains was measured by SEM-EDX. A specific measurement method is as described in the first embodiment. Results are shown in the column "cBN Grains" of the "cBN Sintered Material" in each of Tables 3 and 4.

In each of the cubic boron nitride sintered materials of the samples, the content ratio (volume %) of the first compound in the cBN sintered material, the content ratio (atomic %) of the chromium, the content ratio (atomic %) of the cobalt and the content ratio (atomic %) of the carbon in the first compound, and the type of the first element included in the first compound were measured by TEM-EDX. A specific measurement method is as described in the first embodiment. The content ratio of the first compound in the cBN sintered material is shown in the column "First Compound" of each of Tables 3 and 4. The content ratio of the chromium, the content ratio of the cobalt and the content ratio of the carbon in the first compound, and the type of the first element included in the first compound are shown in the columns "Cr", "Co", "C", and "First Element" in each of Tables 5 and 6.

In the first compound of each of the cubic boron nitride sintered materials of the samples, the ratio Nor/($N_{Cr}$+$N_{Co}$) of the number $N_{Cr}$ of the atoms of the chromium to the sum of the number Nor of the atoms of the chromium and the number $N_{Co}$ of the atoms of the cobalt was measured. A specific measurement method is as described in the first embodiment. Results are shown in the column "$N_{Cr}$/($N_{Cr}$+$N_{Co}$)" in each of Tables 5 and 6.

In each of the cubic boron nitride sintered materials of the samples, the compositions of the components other than the cBN grains and the first compound were specified by TEM-EDX. Results are shown in the column "Binder" in each of Tables 3 and 4. The binder consists of the first compound and components described in the column "Binder". Each of all the cubic boron nitride sintered materials consists of: the cubic boron nitride grains; and the binder consisting of the first compound and the components described in the column "Binder".

In each of the cubic boron nitride sintered materials of the samples, the content ratio (volume %) of the tungsten carbide, the content ratio (volume %) of the cobalt, and the content ratio (volume %) of the aluminum were measured. Here, the content ratio of the cobalt is a content ratio of a simple substance of cobalt, and the content ratio of the aluminum is a content ratio of a simple substance of aluminum. A specific measurement method is as described in the first embodiment. Results are shown in the columns "WC", "Co" and "Al" of each of Tables 3 and 4.

<<X-Ray Diffraction Pattern>>

The X-ray diffraction pattern of the cubic boron nitride sintered material according to the first embodiment was obtained to obtain the first graph in which the X-ray diffraction pattern is indicated in the coordinate system in which the horizontal axis represents the diffraction angle 2θ and the vertical axis represents the diffraction intensity cps. In the first graph, $I_a/I_{BN}$ was calculated. Results are shown in the column "$I_a/I_{BN}$" of each of Tables 5 and 6.

TABLE 3

| | cBN Sintered Material | | | | | |
|---|---|---|---|---|---|---|
| Sample No. | cBN Grains Volume % | First Compound Volume % | WC Volume % | Co Volume % | Al Volume % | Binder (Except for First Compound) |
| 1 | 90.0 | 2.60 | 1.7 | 4.0 | 1.6 | WC, Co, Al |
| 2 | 65.0 | 2.60 | 7.6 | 17.6 | 7.2 | WC, Co, Al |
| 3 | 70.0 | 2.60 | 6.4 | 14.9 | 6.1 | WC, Co, Al |
| 4 | 99.0 | 0.30 | 0.2 | 0.3 | 0.2 | WC, Co, Al |
| 5 | 100.0 | 0.00 | 0.0 | 0.0 | 0.0 | — |
| 6 | 90.0 | 2.60 | 1.7 | 4.0 | 1.6 | WC, Co, Al |
| 7 | 90.0 | 2.60 | 1.7 | 4.0 | 1.6 | WC, Co, Al |
| 8 | 90.0 | 2.60 | 1.7 | 4.0 | 1.6 | WC, Co, Al |
| 9 | 90.0 | 2.60 | 1.7 | 4.0 | 1.6 | WC, Co, Al |
| 10 | 90.0 | 2.60 | 1.7 | 4.0 | 1.6 | WC, Co, Al |
| 11 | 90.0 | 2.60 | 1.7 | 4.0 | 1.6 | WC, Co, Al |
| 12 | 90.0 | 2.60 | 1.7 | 4.0 | 1.6 | WC, Co, Al |
| 13 | 89.9 | 0.03 | 2.4 | 5.4 | 2.2 | WC, Co, Al |
| 14 | 89.9 | 0.07 | 2.3 | 5.4 | 2.2 | WC, Co, Al |
| 15 | 89.9 | 0.65 | 2.2 | 5.1 | 2.1 | WC, Co, Al |
| 16 | 90.0 | 6.50 | 0.8 | 1.9 | 0.8 | WC, Co, Al |
| 17 | 74.0 | 16.00 | 2.3 | 5.4 | 2.2 | WC, Co, Al |
| 18 | 72.0 | 18.00 | 2.3 | 5.4 | 2.2 | WC, Co, Al |
| 19 | 90.0 | 2.60 | 1.7 | 4.0 | 1.6 | WC, Co, Al |
| 20 | 90.0 | 2.60 | 1.7 | 4.0 | 1.6 | WC, Co, Al |
| 21 | 90.0 | 2.60 | 1.7 | 4.0 | 1.6 | WC, Co, Al |
| 22 | 90.0 | 2.60 | 1.7 | 4.0 | 1.6 | WC, Co, Al |
| 23 | 90.0 | 2.60 | 1.7 | 4.0 | 1.6 | WC, Co, Al |
| 24 | 90.0 | 2.60 | 1.7 | 4.0 | 1.6 | WC, Co, Al |
| 25 | 89.0 | 0.05 | 2.6 | 5.9 | 2.4 | WC, Co, Al |
| 26 | 90.0 | 0.10 | 2.3 | 5.4 | 2.2 | WC, Co, Al |
| 27 | 70.0 | 29.00 | 0.2 | 0.5 | 0.2 | WC, Co, Al |
| 28 | 70.0 | 30.00 | 0.0 | 0.0 | 0.0 | — |
| 29 | 90.0 | 2.60 | 1.7 | 4.0 | 1.6 | WC, Co, Al |
| 30 | 90.0 | 2.60 | 1.7 | 4.0 | 1.6 | WC, Co, Al |
| 31 | 90.0 | 2.60 | 1.7 | 4.0 | 1.6 | WC, Co, Al |
| 32 | 90.0 | 2.60 | 1.7 | 4.0 | 1.6 | WC, Co, Al |

TABLE 4

| | cBN Sintered Material | | | | | |
|---|---|---|---|---|---|---|
| Sample No. | cBN Grains Volume % | First Compound Volume % | WC Volume % | Co Volume % | Al Volume % | Binder (Except for First Compound) |
| 33 | 90.0 | 2.60 | 1.7 | 4.0 | 1.6 | WC, Co, Al |
| 34 | 90.0 | 2.60 | 1.7 | 4.0 | 1.6 | WC, Co, Al |
| 35 | 90.0 | 2.60 | 1.7 | 4.0 | 1.6 | WC, Co, Al |
| 36 | 90.0 | 2.60 | 1.7 | 4.0 | 1.6 | WC, Co, Al |
| 37 | 90.0 | 2.60 | 1.7 | 4.0 | 1.6 | WC, Co, Al |
| 38 | 90.0 | 2.60 | 1.7 | 4.0 | 1.6 | WC, Co, Al |
| 39 | 90.0 | 2.60 | 1.7 | 4.0 | 1.6 | WC, Co, Al |
| 40 | 90.0 | 2.60 | 1.6 | 3.6 | 1.5 | WC, Co, Al, TiC |
| 41 | 90.0 | 2.60 | 1.6 | 3.6 | 1.5 | WC, Co, Al, ZrC |
| 42 | 90.0 | 2.60 | 1.6 | 3.6 | 1.5 | WC, Co, Al, HfC |
| 43 | 90.0 | 2.60 | 1.6 | 3.6 | 1.5 | WC, Co, Al, VC |
| 44 | 90.0 | 2.60 | 1.6 | 3.6 | 1.5 | WC, Co, Al, NbC |
| 45 | 90.0 | 2.60 | 1.6 | 3.6 | 1.5 | WC, Co, Al, TaC |
| 46 | 90.0 | 2.60 | 1.6 | 3.6 | 1.5 | WC, Co, Al, TiN |
| 47 | 90.0 | 2.60 | 1.6 | 3.6 | 1.5 | WC, Co, Al, ZrN |
| 48 | 90.0 | 2.60 | 1.6 | 3.6 | 1.5 | WC, Co, Al, HfN |
| 49 | 90.0 | 2.60 | 1.6 | 3.6 | 1.5 | WC, Co, Al, VN |
| 50 | 90.0 | 2.60 | 1.6 | 3.6 | 1.5 | WC, Co, Al, NbN |
| 51 | 90.0 | 2.60 | 1.6 | 3.6 | 1.5 | WC, Co, Al, TaN |
| 52 | 90.0 | 2.60 | 1.6 | 3.6 | 1.5 | WC, Co, Al, CrN |
| 53 | 90.0 | 2.60 | 1.6 | 3.6 | 1.5 | WC, Co, Al, TiCN |
| 54 | 90.0 | 2.60 | 1.6 | 3.6 | 1.5 | WC, Co, Al, ZrCN |
| 55 | 90.0 | 2.60 | 1.6 | 3.6 | 1.5 | WC, Co, Al, HfCN |
| 56 | 90.0 | 2.60 | 1.6 | 3.6 | 1.5 | WC, Co, Al, NbCN |
| 57 | 90.0 | 2.60 | 1.6 | 3.6 | 1.5 | WC, Co, Al, TaCN |
| 58 | 90.0 | 2.60 | 1.6 | 3.6 | 1.5 | WC, Co, Al, AlN |
| 59 | 90.0 | 2.60 | 1.6 | 3.6 | 1.5 | WC, Co, Al, $Al_2O_3$ |
| 60 | 90.0 | 2.60 | 1.6 | 3.6 | 1.5 | WC, Co, Al, $ZrO_2$ |
| 61 | 90.0 | 2.60 | 1.6 | 3.6 | 1.5 | WC, Co, Al, Si |

TABLE 5

| Sample No. | First Compound Cr Atomic % | Co Atomic % | C Atomic % | Co + Cr Atomic % | Co + Cr + C Atomic % | First Element Type | $N_{Cr}/(N_{Cr}+N_{Co})$ | $I_a/I_{BN}$ | Cutting Test |
|---|---|---|---|---|---|---|---|---|---|
| 1 | 26.8 | 18.9 | 15.8 | 45.7 | 61.5 | — | 0.59 | 0.040 | A |
| 2 | 26.8 | 18.9 | 15.8 | 45.7 | 61.5 | — | 0.59 | 0.055 | D |
| 3 | 26.8 | 18.9 | 15.8 | 45.7 | 61.5 | — | 0.59 | 0.050 | A |
| 4 | 26.8 | 18.9 | 15.8 | 45.7 | 61.5 | — | 0.59 | 0.004 | A |
| 5 | 0.0 | 0.0 | 0.0 | 0.0 | 0.0 | — | — | 0.000 | D |
| 6 | 2.3 | 43.4 | 15.8 | 45.7 | 61.5 | — | 0.05 | 0.040 | D |
| 7 | 4.6 | 41.1 | 15.8 | 45.7 | 61.5 | — | 0.10 | 0.040 | C |
| 8 | 9.1 | 36.6 | 15.8 | 45.7 | 61.5 | — | 0.20 | 0.040 | B |
| 9 | 22.9 | 22.9 | 15.8 | 45.7 | 61.5 | — | 0.50 | 0.040 | A |
| 10 | 36.6 | 9.1 | 15.8 | 45.7 | 61.6 | — | 0.80 | 0.040 | A |
| 11 | 41.1 | 4.6 | 15.8 | 45.7 | 61.5 | — | 0.90 | 0.040 | C |
| 12 | 43.4 | 2.3 | 15.8 | 45.7 | 61.5 | — | 0.95 | 0.040 | D |
| 13 | 26.8 | 18.9 | 15.8 | 45.7 | 61.5 | — | 0.59 | 0.001 | C |
| 14 | 26.8 | 18.9 | 15.8 | 45.7 | 61.5 | — | 0.59 | 0.001 | B |
| 15 | 26.8 | 18.9 | 15.8 | 45.7 | 61.5 | — | 0.59 | 0.010 | A |
| 16 | 26.8 | 18.9 | 15.8 | 45.7 | 61.5 | — | 0.59 | 0.100 | A |
| 17 | 26.8 | 18.9 | 15.8 | 45.7 | 61.5 | — | 0.59 | 0.300 | B |
| 18 | 26.8 | 18.9 | 15.8 | 45.7 | 61.5 | — | 0.59 | 0.350 | C |
| 19 | 2.9 | 2.1 | 35.0 | 5.0 | 40.0 | — | 0.58 | 0.040 | B |
| 20 | 5.9 | 4.1 | 30.0 | 10.0 | 40.0 | — | 0.59 | 0.040 | A |
| 21 | 21.7 | 15.3 | 3.0 | 37.0 | 40.0 | — | 0.59 | 0.040 | B |
| 22 | 20.5 | 14.5 | 5.0 | 35.0 | 40.0 | — | 0.59 | 0.040 | A |
| 23 | 13.1 | 9.2 | 7.7 | 22.3 | 30.0 | — | 0.59 | 0.040 | B |
| 24 | 17.4 | 12.3 | 10.3 | 29.7 | 40.0 | — | 0.59 | 0.040 | A |
| 25 | 26.8 | 18.9 | 15.8 | 45.7 | 61.5 | — | 0.59 | 0.001 | B |
| 26 | 26.8 | 18.9 | 15.8 | 45.7 | 61.5 | — | 0.59 | 0.002 | A |
| 27 | 26.8 | 18.9 | 15.8 | 45.7 | 61.5 | — | 0.59 | 0.570 | C |
| 28 | 26.8 | 18.9 | 15.8 | 45.7 | 61.5 | — | 0.59 | 0.593 | D |
| 29 | 26.8 | 18.9 | 15.8 | 45.7 | 61.5 | N | 0.59 | 0.040 | A |
| 30 | 26.8 | 18.9 | 15.8 | 45.7 | 61.5 | Ti | 0.59 | 0.040 | A |
| 31 | 26.8 | 18.9 | 15.8 | 45.7 | 61.5 | V | 0.59 | 0.040 | A |

TABLE 6

| Sample No. | First Compound Cr Atomic % | Co Atomic % | C Atomic % | Co + Cr Atomic % | Co + Cr + C Atomic % | First Element Type | $N_{Cr}/(N_{Cr}+N_{Co})$ | $I_a/I_{BN}$ | Cutting Test |
|---|---|---|---|---|---|---|---|---|---|
| 32 | 26.8 | 18.9 | 15.8 | 45.7 | 61.5 | Zr | 0.59 | 0.040 | A |
| 33 | 26.8 | 18.9 | 15.8 | 45.7 | 61.5 | Nb | 0.59 | 0.040 | A |
| 34 | 26.8 | 18.9 | 15.8 | 45.7 | 61.5 | Mo | 0.59 | 0.040 | A |
| 35 | 26.8 | 18.9 | 15.8 | 45.7 | 61.5 | Hf | 0.59 | 0.040 | A |
| 36 | 26.8 | 18.9 | 15.8 | 45.7 | 61.5 | Ta | 0.59 | 0.040 | A |
| 37 | 26.8 | 18.9 | 15.8 | 45.7 | 61.5 | W | 0.59 | 0.040 | A |
| 38 | 26.8 | 18.9 | 15.8 | 45.7 | 61.5 | Re | 0.59 | 0.040 | A |
| 39 | 26.8 | 18.9 | 15.8 | 45.7 | 61.5 | Si | 0.59 | 0.040 | A |
| 40 | 26.8 | 18.9 | 15.8 | 45.7 | 61.5 | — | 0.59 | 0.040 | A |
| 41 | 26.8 | 18.9 | 15.8 | 45.7 | 61.5 | — | 0.59 | 0.040 | A |
| 42 | 26.8 | 18.9 | 15.8 | 45.7 | 61.5 | — | 0.59 | 0.040 | A |
| 43 | 26.8 | 18.9 | 15.8 | 45.7 | 61.5 | — | 0.59 | 0.040 | A |
| 44 | 26.8 | 18.9 | 15.8 | 45.7 | 61.5 | — | 0.59 | 0.040 | A |
| 45 | 26.8 | 18.9 | 15.8 | 45.7 | 61.5 | — | 0.59 | 0.040 | A |
| 46 | 26.8 | 18.9 | 15.8 | 45.7 | 61.5 | — | 0.59 | 0.040 | A |
| 47 | 26.8 | 18.9 | 15.8 | 45.7 | 61.5 | — | 0.59 | 0.040 | A |
| 48 | 26.8 | 18.9 | 15.8 | 45.7 | 61.5 | — | 0.59 | 0.040 | A |
| 49 | 26.8 | 18.9 | 15.8 | 45.7 | 61.5 | — | 0.59 | 0.040 | A |
| 50 | 26.8 | 18.9 | 15.8 | 45.7 | 61.5 | — | 0.59 | 0.040 | A |
| 51 | 26.8 | 18.9 | 15.8 | 45.7 | 61.5 | — | 0.59 | 0.040 | A |
| 52 | 26.8 | 18.9 | 15.8 | 45.7 | 61.5 | — | 0.59 | 0.040 | A |
| 53 | 26.8 | 18.9 | 15.8 | 45.7 | 61.5 | — | 0.59 | 0.040 | A |
| 54 | 26.8 | 18.9 | 15.8 | 45.7 | 61.5 | — | 0.59 | 0.040 | A |
| 55 | 26.8 | 18.9 | 15.8 | 45.7 | 61.5 | — | 0.59 | 0.040 | A |
| 56 | 26.8 | 18.9 | 15.8 | 45.7 | 61.5 | — | 0.59 | 0.040 | A |
| 57 | 26.8 | 18.9 | 15.8 | 45.7 | 61.5 | — | 0.59 | 0.040 | A |
| 58 | 26.8 | 18.9 | 15.8 | 45.7 | 61.5 | — | 0.59 | 0.040 | A |
| 59 | 26.8 | 18.9 | 15.8 | 45.7 | 61.5 | — | 0.59 | 0.040 | A |
| 60 | 26.8 | 18.9 | 15.8 | 45.7 | 61.5 | — | 0.59 | 0.040 | A |
| 61 | 26.8 | 18.9 | 15.8 | 45.7 | 61.5 | — | 0.59 | 0.040 | A |

Cutting Test

The following cutting test was performed using each of tools (model number: 2NU-CNGA120408) consisting of the cubic boron nitride sintered materials of the samples.

Workpiece: sintered alloy corresponding to F-08C2 (150 HV)

Cutting rate: V=205 m/min.

Feed: f=0.1 mm/rev.

Cut-in: ap=0.2 mm

Wet type/dry type: wet type

Cutting method: continuous cutting

A volume of falling-off of the cutting edge at a cutting distance of 5.9 km was measured. The volume of falling-off of the cutting edge was defined as a width of receding from the position of the cutting edge ridgeline before the cutting. In the column "Cutting Test" of each of Tables 5 and 6, "A" represents a case where the volume of falling-off is less than 150000 $\mu m^3$, "B" represents a case where the volume of falling-off is 150000 $\mu m^3$ or more and less than 200000 $\mu m^3$, "C" represents a case where the volume of falling-off is 200000 $\mu m^3$ or more and less than 300000 $\mu m^3$, and "D" represents a case where the volume of falling-off is more than 300000 $\mu m^3$. It is indicated that as the volume of falling-off is smaller, the tool life is longer.

Review

The cubic boron nitride sintered materials and tools of samples 1, 3, 4, 7 to 11, 13 to 27, and 29 to 61 correspond to examples of the present disclosure. The cubic boron nitride sintered materials and tools of samples 2, 5, 6, 12, and 28 correspond to comparative examples. It was confirmed that each of the tools of the examples of the present disclosure had a longer tool life than that of each of the tools of the comparative examples.

Heretofore, the embodiments and examples of the present disclosure have been illustrated, but it has been initially expected to appropriately combine the configurations of the embodiments and examples and modify them in various manners.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

The invention claimed is:

1. A cubic boron nitride sintered material comprising: 70 volume % or more and 99 volume % or less of cubic boron nitride grains; and a binder, wherein the binder includes a first compound including chromium, cobalt and carbon, tungsten carbide, cobalt, and aluminum, and in the first compound, a ratio $N_{Cr}/(N_{Cr}+N_{Co})$ of the number $N_{Cr}$ of atoms of the chromium to a sum of the number $N_{Cr}$ of the atoms of the chromium and the number $N_{Co}$ of atoms of the cobalt is 0.10 or more and 0.90 or less.

2. The cubic boron nitride sintered material according to claim 1, wherein in a first graph in which an X-ray diffraction pattern of the cubic boron nitride sintered material is indicated in a coordinate system in which a horizontal axis represents a diffraction angle 2θ and a vertical axis represents a diffraction intensity cps, a peak intensity $I_{BN}$ of cubic boron nitride and a peak intensity $I_a$ of the first compound indicate a relation of $0.0010 \leq I_a/I_{BN} \leq 0.300$.

3. The cubic boron nitride sintered material according to claim 2, wherein the peak intensity $I_{BN}$ and the peak intensity $I_a$ indicate a relation of $0.01 \leq I_a/I_{BN} \leq 0.10$.

4. The cubic boron nitride sintered material according to claim 1, wherein the $N_{Cr}/(N_{Cr}+N_{Co})$ is 0.20 or more and 0.90 or less.

5. The cubic boron nitride sintered material according to claim 4, wherein the $N_{Cr}/(N_{Cr}+N_{Co})$ is 0.50 or more and 0.90 or less.

6. The cubic boron nitride sintered material according to claim 1, wherein in the first compound, a total content ratio of the chromium and the cobalt is 10 atomic % or more, a content ratio of the carbon is 5 atomic % or more, and a total content ratio of the chromium, the cobalt and the carbon is 40 atomic % or more.

7. The cubic boron nitride sintered material according to claim 1, wherein a content ratio of the first compound in the cubic boron nitride sintered material is 0.1 volume % or more and 29 volume % or less.

8. The cubic boron nitride sintered material according to claim 1, wherein the first compound includes at least one first element selected from a group consisting of nitrogen, titanium, vanadium, zirconium, niobium, molybdenum, hafnium, tantalum, tungsten, rhenium, and silicon.

9. The cubic boron nitride sintered material according to claim 1, wherein the binder further includes a second compound consisting of at least one element selected from a group consisting of titanium, zirconium, hafnium, vanadium, niobium, tantalum, chromium, and aluminum, and at least one element selected from a group consisting of carbon, nitrogen, and oxygen.

10. The cubic boron nitride sintered material according to claim 1, wherein the binder further includes silicon.

11. A tool comprising the cubic boron nitride sintered material according to claim 1.

* * * * *